United States Patent [19]

Treadwell

[11] 4,173,691
[45] Nov. 6, 1979

[54] CATALYST COMPOSITION FOR FLEXIBLE POLYURETHANE FOAMS

[75] Inventor: Kenneth Treadwell, Rahway, N.J.

[73] Assignee: M&T Chemicals Inc., Stamford, Conn.

[21] Appl. No.: 879,633

[22] Filed: Feb. 21, 1978

[51] Int. Cl.$^2$ ............................................. C08G 18/24
[52] U.S. Cl. ................................ 521/124; 252/431 C; 260/18 TN; 521/125
[58] Field of Search ............................... 521/124, 125; 260/18 TN; 252/431 C

[56] References Cited

U.S. PATENT DOCUMENTS 3,620,985  11/1971  Lankin et al. ................. 260/18 TN
3,940,517  2/1976  DeLeon .............................. 427/373

Primary Examiner—Maurice J. Welsh
Attorney, Agent, or Firm—Kenneth G. Wheeless; Robert Spector

[57] ABSTRACT

The rise times exhibited by flexible polyurethane foams can be significantly reduced using a stannous salt as the gel catalyst in combination with a blowing catalyst that includes an antimony (III) salt of a carboxylic acid and a potassium salt of a carboxylic acid. A zinc salt of a carboxylic acid can optionally replace a portion of the antimony (III) salt. The present blowing catalysts are particularly useful for preparing dielectrically or ultrasonically heat-sealable foams.

18 Claims, No Drawings

CATALYST COMPOSITION FOR FLEXIBLE POLYURETHANE FOAMS

BACKGROUND OF THE INVENTION

This invention relates to flexible polyurethane foams. This invention further relates to a novel blowing catalyst composition for preparing flexible polyurethane foams.

It is known to employ both organic and inorganic tin compounds as the "gel" or polymerization catalyst for flexible polyurethane foams prepared by reacting a polyol with an isocyanate in the presence of a small amount of water. The water reacts with some of the isocyanate to form carbon dioxide, which becomes entrapped within the isocyanate-polyol reaction mixture and causes the resultant foam to rise. In order to prepare a useful foam that is substantially free of structural defects, it is usually necessary to employ a separate catalyst for the isocyanate-water reaction in order to balance the rates of this reaction and the isocyanate-polyol reaction. This catalyst is conventionally referred to as a "blowing" catalyst. A variety of compounds have been employed as blowing catalysts in combination with an inorganic tin compound such as stannous octoate as the gel catalyst. Conventional blowing catalysts include tertiary amines, and alkali metal salts of carboxylic acids. U.S. Pat. No. 3,620,985 teaches that the isocyanate-water reaction can be effectively catalyzed using combinations of certain antimony compounds with a base and a nitrogen-containing organic compound or the reaction product of said base with the nitrogen compound. Useful reaction products include sodium and potassium salts of amino acids, amidoximes and hydroxamic acids.

Surprisingly it has now been found that the reaction product of a base with a nitrogen compound specified in the aforementioned patent can be replaced by a potassium salt of a carboxylic acid containing from 2 to 20 carbon atoms. These compounds act synergistically with antimony (III) salts of carboxylic acids to yield unexpectedly short rise times when used in combination with a stannous salt as the gel catalyst for preparing flexible polyurethane foams.

SUMMARY OF THE INVENTION

This invention provides an improved composition for preparing a flexible polyurethane foam, said composition comprising a polyol having two or three active hydrogen atoms as determined by the Zerewitinoff method, water, a difunctional isocyanate in an amount sufficient to react with substantially all of the polyol and water present in said composition, an effective amount of an organopolysiloxane surfactant, a catalytically effective amount of a gel catalyst of the general formula

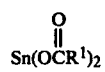

wherein $R^1$ is alkyl and contains from 1 to 19 carbon atoms and a catalytically effective amount of a blowing catalyst, the improvement which resides in the presence in said composition, as the blowing catalyst of an antimony compound exhibiting the formula

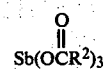

and a potassium salt of the formula

wherein $R^2$ and $R^3$ are individually selected from the same group as $R^1$.

DETAILED DESCRIPTION OF THE INVENTION

The catalyst compositions of this invention contain stannous, antimony and potassium salts of carboxylic acids containing from 2 to 20 carbon atoms. The function of the stannous compound is to catalyze the reaction between the diisocyanate and the polyol to form a polymer containing urethane groups. The primary function of the mixture of antimony (III) and potassium salts is to control the rate of the isocyanate-water reaction to achieve a rise time that is preferably from 60 to 100 seconds, most preferably from 70 to 80 seconds for a commercial process. This rate cannot be achieved using either the antimony or potassium compound alone at concentration levels equal to the concentration of the mixture. It is therefore surprising that by combining these two classes of catalysts one can achieve the desired rise time.

The present "blowing" catalyst compositions can be employed in combination with any of the stannous salts represented by the foregoing formula as the "gel" or polymerization catalyst to prepare flexible polyurethane foams using any of the available polyols and diisocyanates. These catalysts are particularly suitable for foams containing a dispersed halogen-containing polymer such as polyvinyl chloride. Foams containing from 25 to 125 parts by weight (based on polyol) of these polymers can be subsequently exposed to high frequency radiation or ultrasonic waves to form a continuous film on the surface of the foam. This type of foam is referred to in the art as dielectrically or ultrasonically heat-sealable. Methods for preparing these heat sealable foams are well known, however, many of the blowing catalysts conventionally employed for flexible polyurethane have been proven less than satisfactory for use with heat-sealable foams. This is particularly true for amines, which impart a pink color to the final foam. This discoloration is believed due to reaction of the amine with the hydrogen chloride formed when the halogen-containing polymer undergoes a slight decomposition at the elevated temperatures encountered during preparation and heat-sealing of the foam.

The carboxylic acid portion of the present stannous, antimony and potassium salts contains from 2 to 20 carbon atoms and can be represented by the general formula

The acid residues of the salts can be the same or different. Suitable acids that can be used to prepare the stannous, antimony and potassium salts include acetic, propionic, butyric, 2-ethylhexoic, caproic, caprylic, capric and stearic acids. The rise times obtained using this combination of salts can be significantly decreased if a zinc salt of a carboxylic acid containing from 2 to 20 carbon atoms is added to the formulation. Preferably the zinc salt replaces a portion, generally between 20 and 50% by weight, of the antimony salt. Data in the accompanying examples demonstrate that zinc salts are virtually ineffective blowing catalysts for polyurethane foams in the absence of an antimony and a potassium salt.

The concentration of antimony salt in the present two-component catalyst compositions is from 80 to 98% by weight, and the potassium salt constitutes the remaining 2 to 20%. In the three-component compositions, which contain a zinc salt in addition to the antimony and potassium salts, the concentration of the potassium salt is from 2 to 20%, based on the weight of the total composition.

The present catalyst compositions can be used to prepare flexible polyurethane foams by reacting any of the known suitable polyalkylene polyols containing 2 or 3 active hydrogen atoms with a difunctional isocyanate in the presence of water as a blowing agent. Suitable polyalkylene polyols typically exhibit a number average molecular weight greater than 500 and can have either primary or secondary hydroxyl groups. The polyols are usually of the polyether or polyester type, the latter being derived from the reaction of a polyfunctional carboxylic acid with a stoichiometric excess of a polyfunctional alcohol. The resultant polyester contains hydroxyl groups at the ends of virtually all of the polymer chains. Polyether type polyols are conventionally prepared by the polymerization of a lower alkylene oxide such as ethylene oxide, propylene oxide, or a mixture of these two compounds. Other types of polyether polyols can be obtained by polymerization of cyclic ethers containing a four- or five membered ring, such as tetrahydrofuran.

The isocyanate compounds employed to prepare flexible polyurethane foams are typically difunctional and include, for example, hexamethylene diisocyanate, 1,8-diisocyanato-p-menthane and the isomeric xylylene diisocyanates and phenylene diisocyanates. The isomeric tolylene diisocyanates are commercially available. A mixture containing 80% of the 2,4-isomer and 20% of the 2,6-isomer is particularly preferred.

The preparation of flexible polyether based urethane foams can be carried out by forming a prepolymer, i.e., prereacting molar equivalents of the polyether and isocyanate in the absence of water and thereafter producing a foam by the addition of excess isocyanate, water, and the novel catalyst combination of this invention. The production of urethane foams may be carried out by the one-shot method in which the polyether, novel blowing agent combination, and isocyanate reactants are simultaneously mixed together and allowed to react in the presence of water. Urethane foams may also be produced by the semiprepolymer technique in which the polyether reactant is partially extended with excess isocyanate to provide a reaction product containing a high percentage of free isocyanate groups (20-35 percent) which is then formed in a later stage by reaction with the additional polyether and the novel blowing catalyst of this invention.

Formation of the preferred foamed products of this invention in a one-shot system is effected by reacting the polyol with excess polyfunctional isocyanate in the presence of water and the novel blowing catalyst of this invention.

Cell modifying agents, e.g., silicones such as trimethyl end-blocked dimethyl polysiloxanes may also be used in the practice of this invention.

The polyfunctional isocyanate is typically present in an amount of 5 to 300 percent, e.g., 40 percent by weight of the polyol. Water should be present in an amount sufficient to react with the isocyanate to liberate sufficient gas to produce a foam of the desired physical characteristics. Approximately 1 to 10 percent water, based upon the weight of the polyols, is operable. The mixing of the constituents may be carried out at elevated temperatures or at room temperatures.

In a typical 2-step operation the polyols may be reacted with excess polyfunctional isocyanate in the absence of water initially. Subsequently, water and other agents are added to the mixture, i.e., it is possible to prepare a prepolymer by the reaction of the organic polyisocyanate and the organic compound containing at least two active hydrogen-containing groups in a first step and then reacting the resulting isocyanate determined prepolymer with water in the second step in the presence of the novel foaming catalyst of this invention to prepare a cellular polyurethane plastics.

The amount of isocyanate used in the preparation of flexible foams should be such that there is more than the theoretical amount required to form a urethane linkage, —NHCOO—, in the polymer resulting from reaction with the isocyanate with the active hydrogens of the polyether. The amount of isocyanate employed generally ranges from 1 to 7 equivalents, preferably 2 to 6 equivalents, per equivalent of polyether.

The reaction of excess diisocyanate with a polyoxypropylene glycol produces a polymer having terminal isocyanate groups. When it is desired to form a foam, the mixture of the isocyanate-modified polyether reacts through the isocyanate groups with a chain-extending agent containing active hydrogen such as water. This involves several reactions that proceed simultaneously including the reaction between the isocyanate groups and water to form urylene links (—NHCONH—) and carbon dioxide, as well as the reaction of the urylene links so formed with unreacted isocyanate groups to form biuret crosslinks. Depending upon the desired density of the urethane foam and the amount of crosslinking desired, the total isocyanate equivalent to the active hydrogen equivalent should be such as to provide a ratio of 0.8 to 1.2 equivalents of isocyanate per equivalent of active hydrogen, and preferably a ratio of about 0.9 to 1.1 equivalents.

As previously disclosed, the formulation used to prepare the foam can contain from 25 to 125 parts by weight, based on polyol, of a finely divided halogen-containing polymer such as polyvinyl chloride if it is desired to obtain a foam that is heat-sealable using conventional techniques, which include the use of high frequency electrical energy or sound waves. Other suitable halogen-containing polymers include polyvinylidene chloride, chlorinated polyethylene and chlorinated or brominated polystyrene In the practice of this invention, the gel catalyst and the novel blowing catalyst combination may be present in a ratio of 0.01 to 5 parts, preferably 1 part of the former per part of the latter. In one preferred embodiment, when the blowing catalyst combination of this invention is used with stannous 2-ethylhexoate as the gel catalyst, the ratio will be approximately 1.

Preferably the catalyst mixture will be present in catalytic amount corresponding to 0.01 to 5, say 0.6 part by weight per 100 parts of polyol. Preferably, the blowing catalyst will be present in a catalytic amount corresponding to 0.005 to 4.95, say 0.3 part by weight per 100 parts of polyol, and the gel catalyst will be present in catalytic amount corresponding to 0.005 to 4.2 parts, say 0.3 part by weight per 100 parts of polyol.

Specific preferred embodiments of the present compositions are described in the following examples, wherein all parts and percentages are by weight unless otherwise specified.

A "one-shot" flexible, heat-sealable polyurethane foam was prepared using the following base formulation:

| | |
|---|---|
| Polyol (condensation product of glycerine and propylene oxide, average molecular weight of 3,000, average hydroxyl number of 56) | 100.0 |
| Vinyl Chloride Polymer (Tenneco #1757) | 70.0 |
| Trichlorofluoromethane | 5.0 |
| Water | 4.0 |
| Surfactant (end-blocked dimethyl polysiloxane, type L-550 from Union Carbide Chemical Co.) | 1.5 |
| Stannous Octoate (gel catalyst) | 0.3 |
| Blowing Catalyst | as noted in following tables |

The foregoing base formulation was combined with 52.1 parts of an 80:20 weight ratio mixture of 2,4- and 2,6-tolylene diisocyanates. The resultant mixture was stirred rapidly for several seconds and then allowed to rise. The number of seconds which elapsed between combining of the two components and opacification of the initially clear mixture is designated in the following tables as the "cream time." The number of seconds between combining of the ingredients and the time at which the foam reached its final height is referred to as the "rise time."

The blowing catalysts evaluated included antimony tris(2-ethylhexoate), potassium-2-ethylhexoate and zinc bis (2-ethylhexoate). Three mixtures containing antimony tris (2-ethylhexoate) with potassium-2-ethylhexoate alone or in combination with the corresponding zinc salt were also evaluated, and are designated as catalysts A, B and C. The mixtures also included a polypropylene glycol available as Pluracol ®P-410 for the purpose of solubilizing the catalyst.

| | |
|---|---|
| Catalyst A | 80 parts antimony tris(2-ethylhexoate) |
| | 13 parts potassium-2-ethylhexoate |
| | 107 parts polypropylene glycol |
| Catalyst B | 40 parts antimony tris(2-ethylhexoate) |
| | 40 parts zinc bis(2-ethylhexoate) |
| | 13 parts potassium-2-ethylhexoate |
| | 107 parts polypropylene glycol |
| Catalyst C | 90 parts antimony tris(2-ethylhexoate) |
| | 6.5 parts potassium-2-ethylhexoate |
| | 103.5 parts polypropylene glycol |

TABLE 1

Catalytic Activity of Antimony, Potassium and Zinc Salts Used Individually

| Catalyst | Concentration (parts) | Cream Time (seconds) | Rise Time (seconds) |
|---|---|---|---|
| Potassium-2-ethylhexoate | 0.04 | 26 | 191 |
| | 0.39 | 13 | 115 |
| | 0.60 | 22 | 139 |
| Antimony tris (2-ethylhexoate) | 0.12 | 23 | 161 |
| | 0.3 | 21 | 127 |
| Zinc bis(2-ethylhexoate) | 0.12 | 21 | 174 |
| | 0.3 | 19 | 149 |

TABLE 2

Catalytic Activity of Mixtures Containing Antimony, Potassium and Zinc Salts

| Catalyst Mixture | Concentration (parts) | Cream Time (seconds) | Rise Time (seconds) |
|---|---|---|---|
| A | 0.3 | 19 | 107 |
| | 0.6 | 16 | 91 |
| B | 0.3 | 19 | 98 |
| | 0.6 | 15 | 78 |
| C | 0.6 | 16 | 95 |

The concentration of antimony tris(2-ethylhexoate) in mixture A is 80/200 or 40%, and the concentration of the potassium salt is 13/200 or 6.5%. It is therefore evident that 0.3 part of this mixture contains 0.12 part of the antimony compound and 0.02 part of the potassium compound. The data in Table 1 disclose that the rise times achieved using 0.12 part of the antimony salt or 0.04 part of the potassium salt were 161 and 191 seconds, respectively. The rise times achieved using 0.3 part of the antimony compound or 0.39 part of the potassium compound were 127 and 115 seconds, respectively. Since the shortest rise time obtained using the catalysts individually is 115 seconds, which required a concentration of 0.4 part of the potassium compound, one would expect a considerably longer rise time using a mixture containing only 0.02 part of the potassium compound and 0.12 part of the antimony compound. Yet the rise time achieved using this mixture was 107 seconds. This value cannot be attributed to any additive effect of the two component catalysts.

The combination of 0.06 part of the antimony compound, 0.06 part of the zinc compound and 0.02 part of the potassium compound present in mixture B achieved an even shorter rise time of 98 seconds.

The synergistic effect of the potassium salt is supported by the data for catalyst mixture C. This mixture contained slightly less than half the amount of potassium compound present in mixture A. At a concentration level twice that of mixture A (0.6 part) the decrease in rise time was only marginal. Since the concentration of the potassium salt in the formulation used to prepare the foam with mixture C was equivalent to that present in the formulation containing catalyst mixture A and the concentration of antimony compound was considerably higher (0.6 × 45% = 0.27 part), one would expect a considerably shorter rise time for the formulation containing catalyst C than for the formulation containing catalyst A, yet the experimental data fail to demonstrate this expected effect.

What is claimed is:

1. In an improved composition for preparing a flexible polyurethane foam, said composition comprising a polyol having two or three active hydrogen atoms as determined by the Zerewitinoff method, water, a difunctional isocyanate in an amount sufficient to react with substantially all of the polyol and water present in said composition, an effective amount of an organopolysiloxane surfactant, a catalytically effective amount of a gel catalyst of the general formula

wherein $R^1$ is alkyl and contains from 1 to 19 carbon carbon atoms and a catalytically effective amount of a blowing catalyst, the improvement which resides in the presence in said composition, as the blowing catalyst, of an antimony compound of the formula

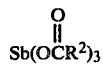

and a potassium salt of the formula

wherein $R^2$ and $R^3$ are individually selected from the same group as $R^1$.

2. An improved composition according to claim 1 wherein the blowing catalyst contains from 80 to 98% by weight of the antimony compound and from 2 to 20% of the potassium compound.

3. An improved composition according to claim 2 wherein the potassium compound constitutes from 4 to 10%, based on the combined weight of the antimony and potassium compounds.

4. An improved composition according to claim 1 wherein the blowing catalyst also contains a zinc compound of the formula

wherein $R^4$ is selected from the same group as $R^1$, in an amount from 20 to about 50%, based on the combined weight of said antimony, zinc and potassium compounds, and the potassium salt is present in an amount from 2 to 20%, based on the combined weight of said antimony, zinc and potassium compounds.

5. An improved composition according to claim 1 wherein said gel catalyst is a stannous salt of an acid containing from 2 to 18 carbon atoms.

6. An improved composition according to claim 5 wherein said acid is an octoic acid.

7. An improved composition according to claim 1 wherein $R^2$ and $R^3$ each contain from 1 to 11 carbon atoms.

8. An improved composition according to claim 7 wherein $R^2$ and $R^3$ each contain 7 carbon atoms.

9. An improved composition according to claim 1 wherein said flexible polyurethane foam is dielectrically or ultrasonically heat-sealable and wherein said composition contains from 25 to 125 parts by weight per 100 parts of said polyol of a finely divided halogen-containing polymer.

10. An improved composition according to claim 9 wherein said halogen-containing polymer is selected from the group consisting of polyvinyl chloride, polyvinylidene chloride, chlorinated polyethylene, chlorinated polystyrene and brominated polystyrene.

11. An improved composition according to claim 10 wherein said halogen-containing polymer is a vinyl chloride polymer.

12. In an improved blowing catalyst composition for flexible urethane foams containing an antimony compound as one of the components of said composition, the improvement which resides in said composition comprising a potassium salt of the formula

in combination with an antimony compound of the formula

wherein $R^1$ and $R^2$ are individually selected from the group consisting of alkyl radicals containing from 1 to 19 carbon atoms.

13. An improved catalyst composition according to claim 12 wherein the composition contains from 80 to 98% by weight of the antimony compound and from 2 to 20% of the potassium compound.

14. An improved catalyst composition according to claim 13 wherein the potassium compound constitutes from 4 to 10%, based on the combined weight of the antimony and potassium compounds.

15. An improved composition according to claim 12 wherein the blowing catalyst also contains a zinc compound of the formula

wherein $R^4$ is selected from the same group as $R^1$, in an amount from 20 to about 50%, based on the combined weight of said antimony, zinc and potassium compounds, and the potassium salt is present in an amount from 4 to 10%, based on the combined weight of said antimony, zinc and potassium compounds.

16. An improved composition according to claim 12 wherein $R^1$ and $R^2$ each contain from 1 to 11 carbon atoms.

17. An improved composition according to claim 12 wherein $R^1$ and $R^2$ each contain 7 carbon atoms.

18. An improved composition according to claim 12 wherein said flexible polyurethane foams are dielectrically or ultrasonically heat-sealable.

* * * * *